United States Patent [19]

Scannell

[11] 4,185,213
[45] Jan. 22, 1980

[54] GASEOUS ELECTRODE FOR MHD GENERATOR

[75] Inventor: Edward P. Scannell, Florence, Ala.

[73] Assignee: Reynolds Metals Company, Richmond, Va.

[21] Appl. No.: 829,506

[22] Filed: Aug. 31, 1977

[51] Int. Cl.² ............................................. H02N 4/02
[52] U.S. Cl. ..................................... 310/11; 313/231.4
[58] Field of Search ................... 310/10, 11; 176/3–7; 333/99 PL; 313/231, 231.4, 63, 161; 315/111, 111.4; 219/121 P

[56] References Cited

U.S. PATENT DOCUMENTS

| | | | |
|---|---|---|---|
| 1,916,076 | 6/1933 | Rupp | 310/11 |
| 3,243,713 | 3/1966 | Brahm | 310/11 X |
| 3,278,798 | 10/1966 | Fabre et al. | 310/11 |
| 3,417,287 | 12/1968 | Murayama | 313/231.4 X |
| 3,418,206 | 12/1968 | Hall et al. | 310/11 X |
| 3,462,622 | 8/1969 | Cann et al. | 310/11 |
| 3,476,968 | 11/1969 | Omura | 313/161 X |
| 3,480,805 | 11/1969 | Verrell | 310/11 |
| 3,505,550 | 4/1970 | Levoy et al. | 310/11 X |
| 3,524,086 | 8/1970 | Lindley | 310/11 |
| 3,634,704 | 1/1972 | Stix | 310/11 |
| 3,778,656 | 12/1973 | Fremiot et al. | 176/3 X |
| 4,016,438 | 4/1977 | Holt | 310/11 |
| 4,119,876 | 10/1978 | German et al. | 313/231.4 |

Primary Examiner—Donovan F. Duggan
Attorney, Agent, or Firm—Glenn, Lyne, Girard, Clark & McDonald

[57] ABSTRACT

A gaseous electrode for a magnetohydrodynamic (MHD) generator is positioned in a primary magnetic field. Single or multiple openings or slots are provided in the electrode from which a gaseous plume or plumes may be emitted into the main MHD channel depending on whether one or more than one opening is provided. The openings or slots are normally oriented parallel to the magnetic field, but can be at an angle to the magnetic field. The electrode is formed having an inter cavity which is continuously filled with an ionizable inert gas. Microwave or RF energy is radiated into the cavity to ionize the gas thereby generating an ionized plasma source from which a gaseous plasma plume may be formed. The plasma plume is injected into the MHD generator's main channel thereby forming a gaseous electrode. The electrode is oriented in the main channel opposed by at least a second electrode which may be of the same or a different configuration. One of the electrodes acts as an emitter and the other electrode acts as a collector. Generally the electrodes are interchangeable in function.

17 Claims, 15 Drawing Figures

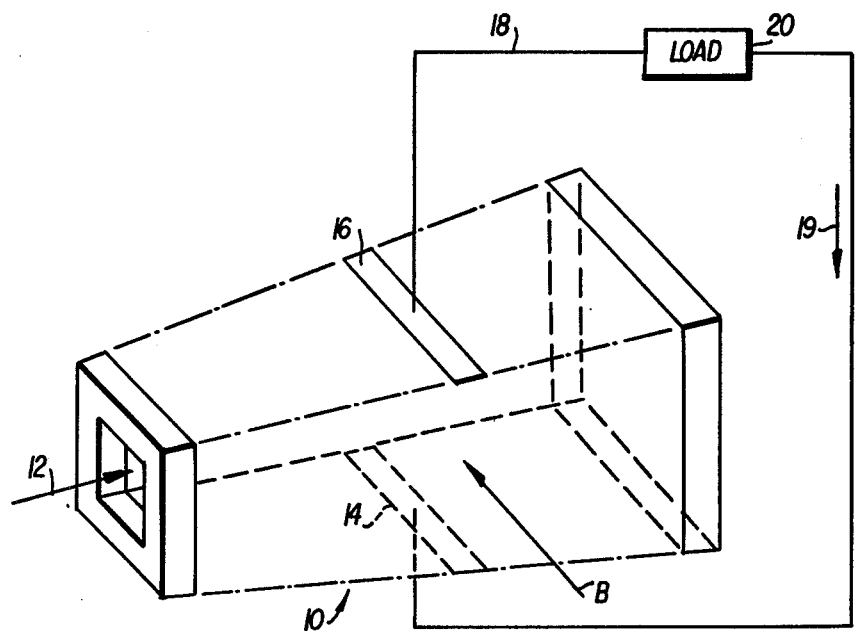
FIG. 1
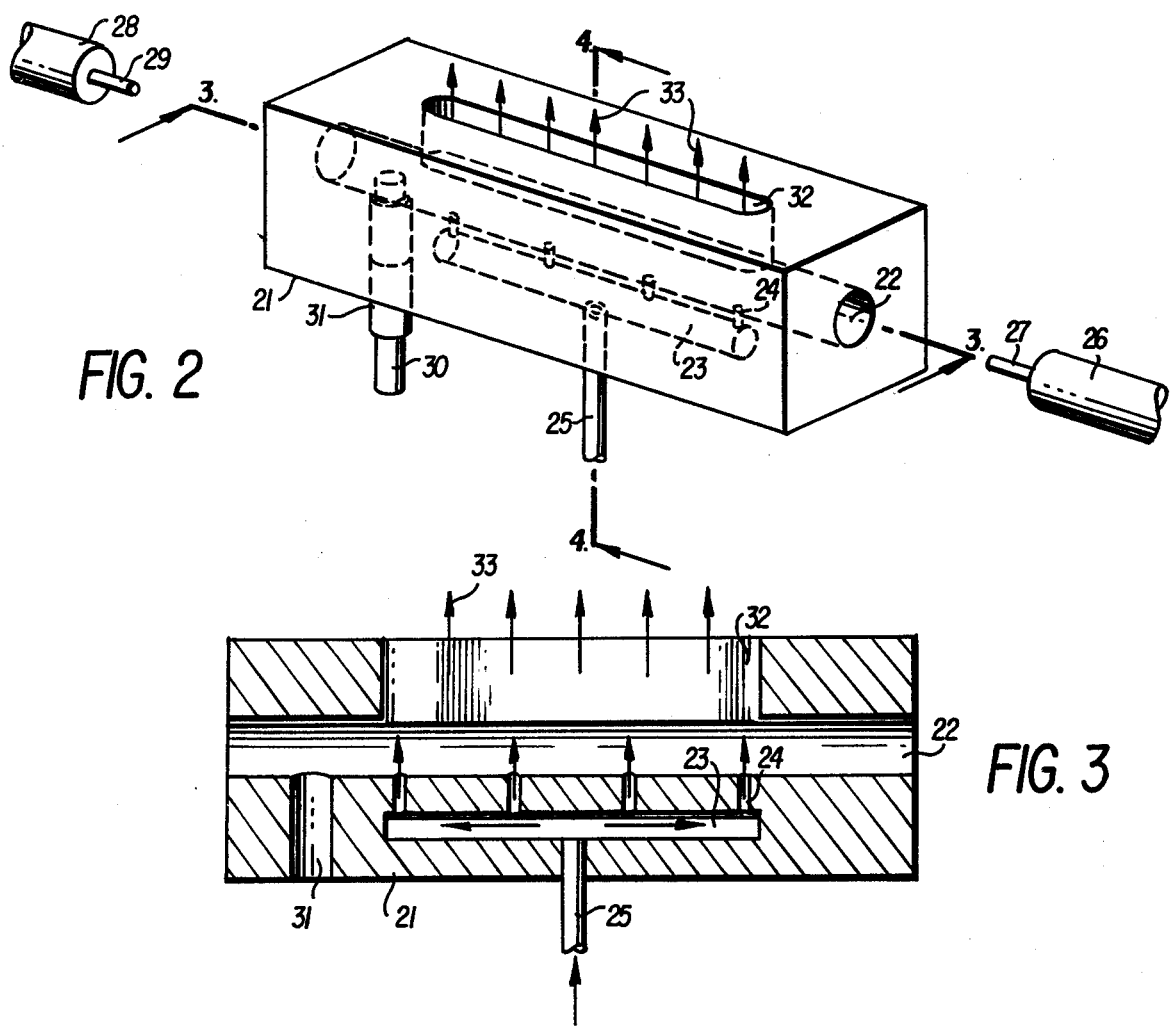
FIG. 2
FIG. 3

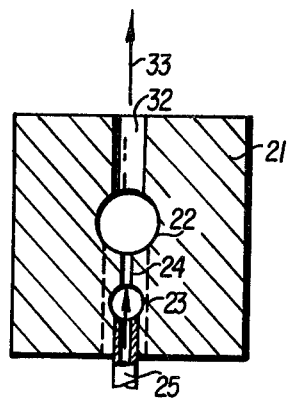
FIG. 4
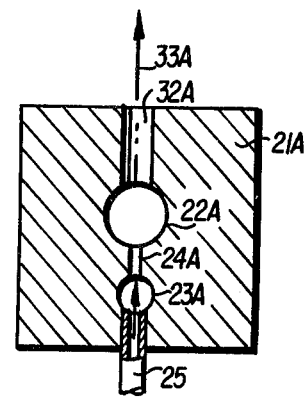
FIG. 7
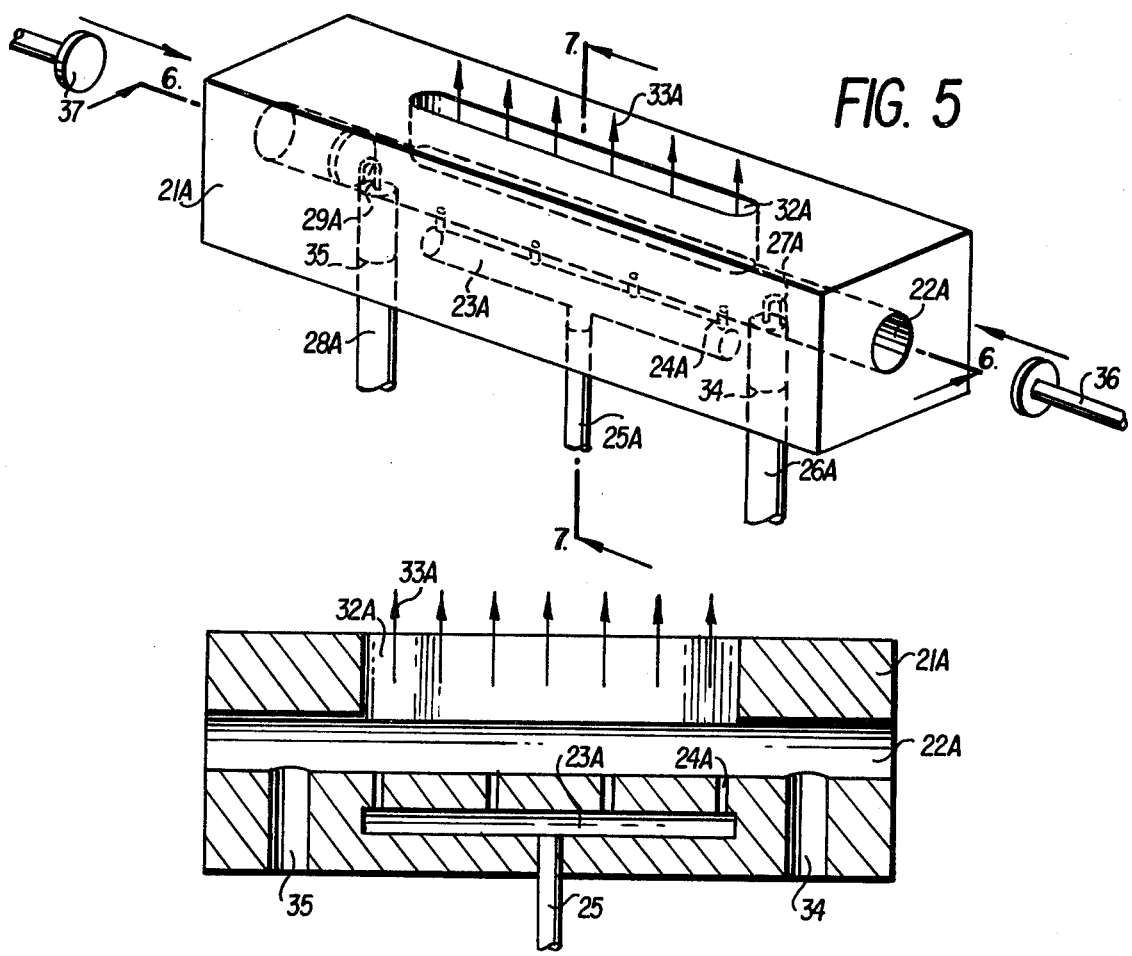
FIG. 5
FIG. 6

GASEOUS ELECTRODE FOR MHD GENERATOR

BACKGROUND OF THE INVENTION

This invention relates to magnetohydrodynamic (MHD) generators and, more specifically, to an improved gaseous electrode for such generators wherein a conducting gas or plasma effluent is emitted from a side wall of the generator.

MHD generators produce electrical power by the motion of high temperature electrically conductive gases through a main MHD channel past a magnetic field oriented at an angle, usually 90°, with respect to the gas flow. This movement induces an electromotive force (EMF) between opposed electrodes mounted in the side walls of the generator at an angle, usually 90°, with respect to the magnetic field. The rapid motion of the high temperature gases, however, in many cases may seriously erode a generator's electrodes, particularly a solid electrode, as do internal electric arcs which connect the electrodes to a load. Although gaseous electrodes have been suggested in the past as a solution to this problem, it is an object of this invention to provide an improved gaseous electrode using electrically conducting gases such that the electrodes do not wear out even though they may be subjected to high density generator currents.

Gaseous electrodes have previously been suggested wherein an arc is caused to move from place to place within a cavity along one or more openings in the electrode. The arc ionizes the gas in the immediate vicinity of the moving arc thereby filling the electrode cavity on the average after a certain period with ionized gas. The ionized gas is then discharged or injected into the generator's main channel to form an electrically conductive plasma plume. Such arc structures have been observed as exhibiting a cathode spot phenomenon. It has been found that the cathode spot may be caused to move from place to place by a magnetic field. It has been suggested that the longitudinal movement of the cathode spot arc can be controlled by a secondary magnetic field generated by a coil wrapped around the electrode.

Further, as an improvement over using a coil wrapped around the electrode, it has been suggested that the arc cathode spot could be caused to move back and forth in the electrode cavity in a controlled manner by positioning the electrode at an angle with respect to the MHD magnetic field. Positioning the electrode at an angle different than 90° is believed to cause the arc to move in both the circumferential and longitudinal directions. The angle at which the electrode is positioned with respect to the magnetic field is known as the "yaw" angle as is more fully described in U.S. Pat. application 643,946 filed Dec. 24, 1975 and assigned to the same assignee as this application.

Such structures as described above, however, have not necessarily been as simple or reliable as might be desired. For example, since the moving arc only ionizes the gas flowing past it in a localized region in the immediate vicinity of the arc column, it is difficult to simultaneously fill the plasma effluent slot with a uniform plasma plume, necessary for the MHD current to remain in a diffuse sheet form, thereby avoiding harmful arc currents. As another example, the "yaw" angle required to move the arc column in the above design is difficult to incorporate into most MHD channel configurations.

Therefore, it is a primary object of this invention to provide a structure and method for generating a plasma plume which will cause a diffuse current rather than a localized current to flow from one electrode to an opposing electrode, without requiring a particular angle of orientation with respect to the magnetic field of the MHD generator.

SUMMARY OF THE INVENTION

In accordance with the principles of this invention, an electrode is positioned in the side wall of the main channel of an MHD generator. The primary magnetic field is positioned at 90° with respect to the flow of the plasma in the main channel of the generator, and the plasma flow is at a 90° angle with respect to the primary axis of the electrode. According to the primary aspect of the invention, an inert gas is introduced into a longitudinal cavity in the electrode and microwave or RF energy is radiated into the cavity to ionize the gas. The ionized gas is then discharged or injected into the main MHD channel to provide a plasma plume electrode from which a diffuse MHD current will flow from one electrode to another electrode on the opposite side of the channel thereby forming, in effect, a current curtain through which the plasma gases of the main MHD channel must flow. Under these conditions it is believed that more power may be extracted from the generator because the diffuse current curtain is believed to present a higher current density through the load than would be the case with a more localized current as heretofore generated when an arc was caused to move from one point to another in the slot of a gaseous electrode as herein above described in the prior art generators and that the diffuse current curtain will cause much less erosion of the electrode metal surfaces and fewer perturbations in the channel plasma flow.

BRIEF DESCRIPTION OF THE DRAWINGS

The following and other objects, features, and advantages of the invention will be apparent from the following more particular description of the present preferred embodiments as illustrated in the accompanying drawings in which like-reference characters refer to the same parts throughout the various views. The drawings are not necessarily to scale, emphasis instead being placed on illustrating the principles of the invention.

FIG. 1 is a schematic illustration of a Faraday-type MHD generator having electrodes positioned diametrically opposed one another.

FIG. 2 is a schematic partially exploded pictorial illustration of an electrode used in the MHD generator of FIG. 1.

FIG. 3 is a cross-sectional view of FIG. 2 taken along the line 3—3 thereof.

FIG. 4 is a cross-section of FIG. 2 taken along the line 4—4 thereof.

FIG. 5 is a second embodiment in schematic partially exploded pictorial illustration of an electrode which may be used in the MHD generator of FIG. 1.

FIG. 6 is a cross-sectional view of FIG. 5 taken along the line 6—6 thereof.

FIG. 7 is a cross-sectional view of FIG. 5 taken along the line 7—7 thereof.

DETAILED DESCRIPTION OF PRESENT PREFERRED EMBODIMENTS OF THE INVENTION

Figure 8A:
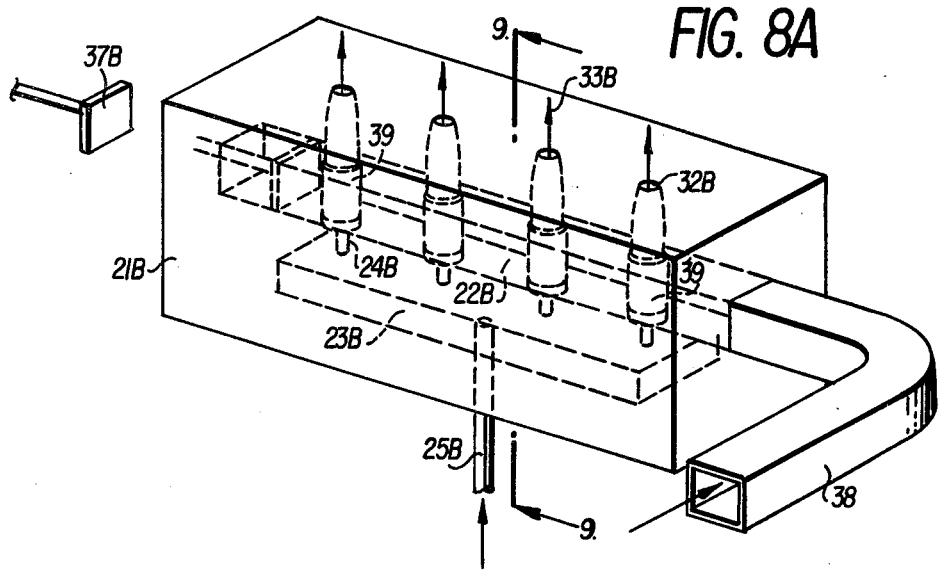
FIG. 8A is a third embodiment in schematic partially exploded pictorial illustration of an electrode which may be used in the MHD generator of FIG. 1.

A conventional MHD generator is comprised of a main duct 10 (FIG. 1) which receives a main stream of high temperature, electrically conductive plasma at an inlet end as indicated by arrow 12.

By properly choosing the shape and desired discharge pressure of the duct 10, the plasma 12 can be made to move through the duct past the electrodes at a substantially constant velocity. Schematically illustrated electrodes 14 and 16 are connected in circuit 18 to a load 20. A suitable magnetic flux, sometimes referred to as a "prime" flux, represented by an arrow B is positioned across the duct in a direction perpendicular to both the plasma flow 12 and the EMF current 19 generated between the electrodes 14 and 16.

The improved electrodes of this invention disclose and describe a method of generating a plasma plume by high frequency (HF) electromagnetic wave radiation (microwave or RF wave). As used herein RF=1–500 MHZ and microwave=500–10,000 MHZ. These high frequency electromagnetic wave generated plasma plumes eliminate many problems which are encountered with plasma plumes produced by an arc source as discussed above, such as; (1) with the arc source generators, the MHD channel window frame segments should be inclined at a "yaw" angle to the magnetic field which is very difficult to incorporate into practical channel design or an auxiliary magnetic source must be used; (2) arc source generators require a cylindrical cathode and anode which are subject to high erosion rates even though the arc may be non-stationary; (3) the arc source generator can be very erratic and unpredictable at times thereby causing uneven electrode wear and possible early failure; (4) the arc source generator operation provides only a very localized area of ionization in the immediate vicinity of the arc as it moves from point to point along the length of the electrode (this presents the possibility of causing the MHD current to form a constricted discharge or arc across the channel, thereby interrupting the channel flow and probably causing increased electrode wear; whereas if a channel current would remain in a diffuse state as is provided with this invention, both of these effects could be eliminated); and (5) the power requirements for the arc source generator are greater than the power requirements for the equivalent output frequency source generator thereby making the latter more efficient.

FIG. 2 shows a copper electrode 21 which may be substituted for either or both electrodes 14 and 16 of FIG. 1 in order to carry out the operation of the improved electrode of this invention in an MHD generator. Electrode 21 has a long cylindrical cavity 22 therethrough wherein an inert gas such as argon is ionized as hereinafter described. Communicating with the cavity 22 are a plenum chamber 23 and an emission opening 32 through which the plasma plume 33 is emitted. The plenum chamber 23 communicates with the cylindrical cavity 22 by connecting conduits 24. The conduit 25 is a gas infeed conduit for filling the plenum chamber 23 with the inert gas which in turn is injected through the connecting conduits 24 to the cylindrical cavity 22 wherein the gas is ionized in the following manner.

A coaxial cable antenna comprising an outer conductor 26 and inner conductor 27, electrically insulated from each other, is inserted in the right hand end opening of the cavity 22 wherein HF power (microwave or RF) is radiated therefrom to ionize the gas which has been injected into the cavity 22 as above described. Power is radiated from the antenna by a conventional L-C oscillator, microwave magnetron, klystron, or other known HF sources connected to the antenna. The ionization of the gas is caused by the large electromagnetic field intensity generated by the resonance within the cavity. The opposite end of the cavity 22 is closed with a diagnostic antenna which acts as a receiver comprising an outer conductor 28 and an inner conductor 29. The diagnostic antenna is inserted in the cavity for recording parameters from which the output field strength, plasma admittance, electron density, frequency, and distribution, plasma collision frequencies and electrode breakdown can be obtained by standard HF techniques. In order to help tune the cavity 22, a tuning stub 30 may be inserted through opening 31 at approximately $\frac{1}{4}$ wave length from the end of the diagnostic antenna 29, thereby assisting in matching the cavity impedance to that of the antenna and the power source. In each of the FIGS. 2 and 3 a plasma plume of diffuse electron emission, shown by arrows 33, is emitted from the opening 32 into the main channel duct of FIG. 1 during the operation of the respective electrodes.

The electrode structure shown in FIGS. 2, 3 and 4 operate using the electric field emitted by the antenna 27 which ionizes, or "breaks down" the gas in the cavity. The inert gas is ionized by the relatively large electromagnetic field intensity built up by the cavity resonance. The cavity resonance is controlled by adjusting the tuning stub to match the cavity impedance to that of the antenna and the HF source. The generated cavity resonance is effective to breakdown the inert gas in the cavity thereby making the ionized gas available for emission as a plasma plume into the main channel as herein above described.

Further, by using the antennas 27 and 29 as herein above described, it is possible to produce a plasma plume output as well as diagnostic data by simultaneously powering each antenna so as to excite two cavity modes of oscillation. The antenna 27 may be powered to break down or ionize the gas with a high power source, while the antenna 29 may be powered to obtain the diagnostic data using a low power source. Another method of operating the electrode would be to use high power HF pulses emitted from the antenna 27 at a high repetition rate so as to keep the plasma uniformly ionized but with low power diagnostic pulses emitted from the same antenna in between the high power breakdown pulses for diagnostic readings.

The embodiment of FIG. 5 shows a copper electrode 21A similar to the electrode shown in FIG. 2. The electrode 21A has a cylindrical cavity 22A therethrough wherein the inert gas is ionized in a similar manner as described in the operation of FIG. 2, except as follows. The FIG. 5 embodiment differs from the FIG. 2 embodiment in that a coaxial antenna comprising an outer conductor 26A forming a "loop" connected to the inner conductor 27A is inserted through the bottom of the electrode through opening 34. Similarly on the opposite end of the electrode a diagnostic coaxial antenna comprising an outer conductor 28A forming a "loop" connected to the inner conductor 29A is inserted in an opening 35. Each antenna functions in the same manner as the corresponding antenna of FIG. 2. In order to achieve resonance in the cavity 22A tuning stubs 36 and 37 are inserted in each end of the cavity. The stubs are positioned to achieve the desired resonance in the cavity 22A, as herein above described. However, using the electrode structure disclosed in FIGS. 5, 6 and 7, the magnetic field component of the HF radiated wave which is emitted by the antenna 27A rather than the electric field component of the HF radiated wave excites the resonant cavity standing wave. This is different from the embodiment of FIG. 2.

If higher frequency cavities are required for more efficient plasma production in the embodiments of FIGS. 2 and 5, waveguides rather than coaxial conductors may be used, with associated slot-type antennas being used to excite the proper cavity resonance modes. However, this method should not be confused with the multiple-nozzle configuration discussed in the embodiment of FIG. 8A.

FIG. 8A discloses a third embodiment of the electrode of this invention wherein a wave guide 38 channels HF power into a rectangular cavity 22B. A tuning stub 37B is inserted into the opposite end of the cavity in order to tune the resonance of the cavity in the manner described in the tuning of the embodiments of FIGS. 2 and 5. The gas conduit 25B, plenum chamber 23B, connecting conduits 24B, and cavity 22B are similar in structure to those disclosed in FIGS. 2 and 5. However, in this embodiment of the invention the plasma plume is emitted through a plurality of nozzles 32B and not through a longitudinal slot opening as herein above described in FIGS. 2 and 5. Another difference in this embodiment is that, instead of the electromagnetic wave breaking down gas filling the whole cavity, breakdown occurs only inside the transparent tubes 39 which are located one-half wave length apart (starting one-fourth wave length from the reflecting stub 37B). In this embodiment, no portion of the wave guide or cavity need be pressurized or made gas tight since the gas is injected from the plenum 23B, through the tubes 39 within which ionization occurs, to the nozzles 32B. After the ionization of the inert gas in the transparent tubes 39 at the intersection of these with the cavity 22B, the gas will pass through the nozzles 32B into the main stream of the MHD channel as plasma plumes 33B. Conduction of the MHD current would be through the plasma plume or efflux to the inter portion of the copper electrode nozzles 32B.

Figure 8B:
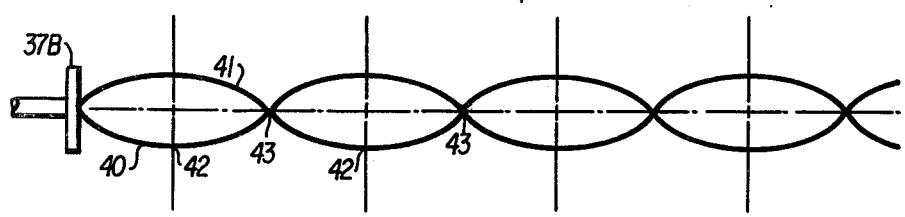
FIG. 8B is a schematic of the electric field standing wave showing the incident plus reflected waves with anti-nodes (maxima) which are positioned coincident with the jets shown in FIG. 8A as will be hereinafter described.
Figure 9:
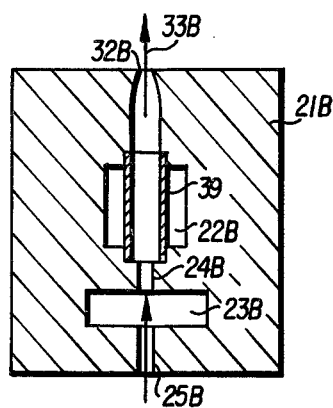
FIG. 9 is a cross-section view of FIG. 8A taken along the line 9—9 thereof.

FIG. 8B discloses a schematic representation of the standing wave which would be used to ionize the gas in the electrode of FIG. 8A. The tuning stub 37B is used to reflect the wave 50 to form reflected wave 41. The input and reflected wave then forms a standing wave having nodes (field minima) 42 and anti-nodes (field maxima) 43. It is intended that the standing wave be so positioned in the cavity 22B such that the anti-nodes maximum field intensity will coincide with the position of the transparent tubes 39. Therefore, maximum gas breakdown is achieved at the tube location for a given power input from the waveguide 38. It is obvious that if the anti-nodes of the standing wave are positioned at the location of the transparent tubes 39 that the nodes will be located half way between the adjacent transparent tubes 39.

Figure 12:
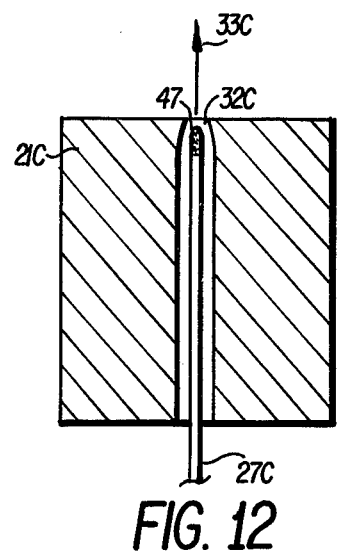
FIG. 12 is a cross-sectional view of FIG. 10 taken along the line 12—12 thereof.
Figure 10:
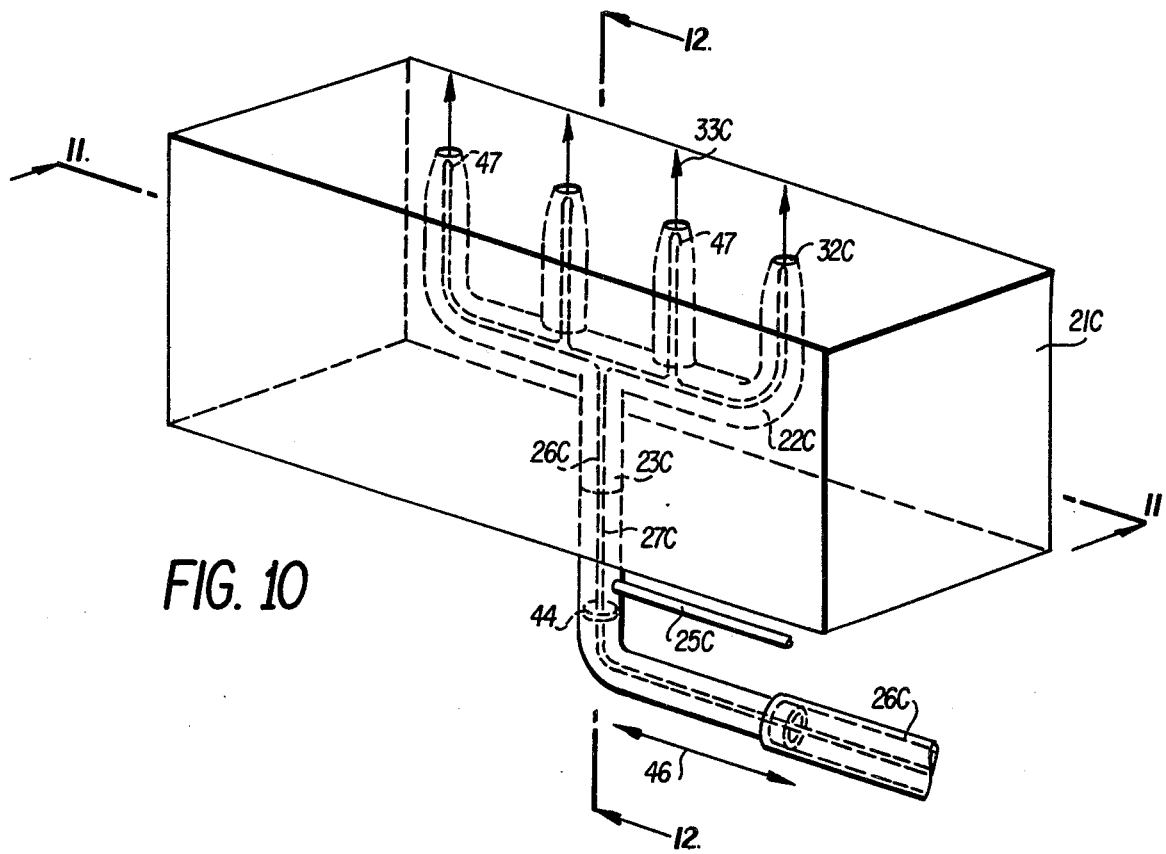
FIG. 10 is a fourth embodiment in schematic pictorial illustration of an electrode which may be used in the MHD generator of FIG. 1.
Figure 11:
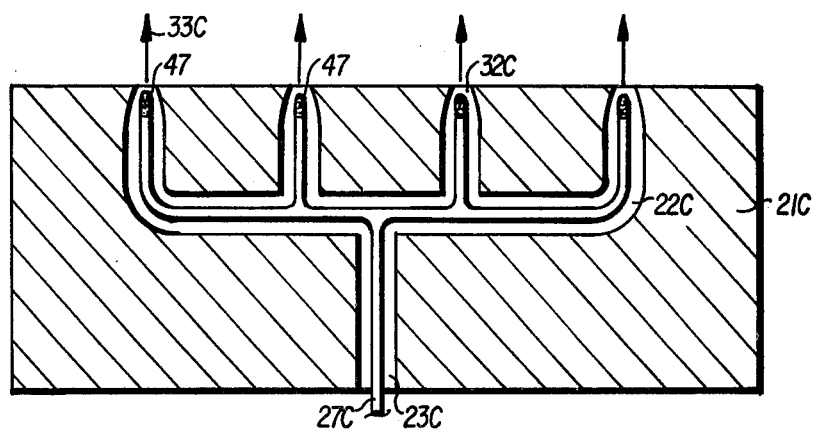
FIG. 11 is a cross-sectional view of FIG. 10 taken along the line 11—11 thereof.

The first three herein above described embodiments of this invention all use high-frequency cavity resonance breakdown techniques, while the fourth embodiment disclosed in FIGS. 10, 11 and 12 is a version of a high frequency plasma torch electrode using high frequency energy and not the arc source technique as used in prior art arc torch electrodes. The electrode disclosed in FIG. 10 is comprised of a copper electrode 21C having therein an inter coaxial-conductor 27C spaced in the gas plenum 23C. Positioned in the inter-conductor space is a gas seal 44 the functions of which will be hereinafter described.

The electrode of FIG. 10 is operated by feeding inert gas through the gas conduit 25C into the plenum opening 23C which in turn feeds the inter-conductor space 22C wherein the inert gas is ionized as hereinafter described by the electromagnetic field. In order to insure that the gas does not flow back down the plenum chamber 23C into the HF input line 26C the opaque seal 44 is placed therein. The seal is an insulator of material opaque to gas but not to the energy radiated by the antenna. Impedance matching in this embodiment is achieved by telescoping the outer conductor 26C backward and forward as indicated by arrow 46 to achieve the desired impedance matching. Since the inner conductor 27C is exposed to high temperatures near the plasma efflux opening 32C, it should include a refractory metal tip 47, such as thoriated tungsten, to withstand high temperatures.

With each of the four embodiments of the electrodes disclosed in FIGS. 2, 5, 8A and 10, it can be seen that high frequency energy is used to ionize the inert gas which is subsequently injected or emitted into the main MHD channel. Accordingly, most of the problems encountered with electrodes using the arc source are effectively overcome.

Figure 13:
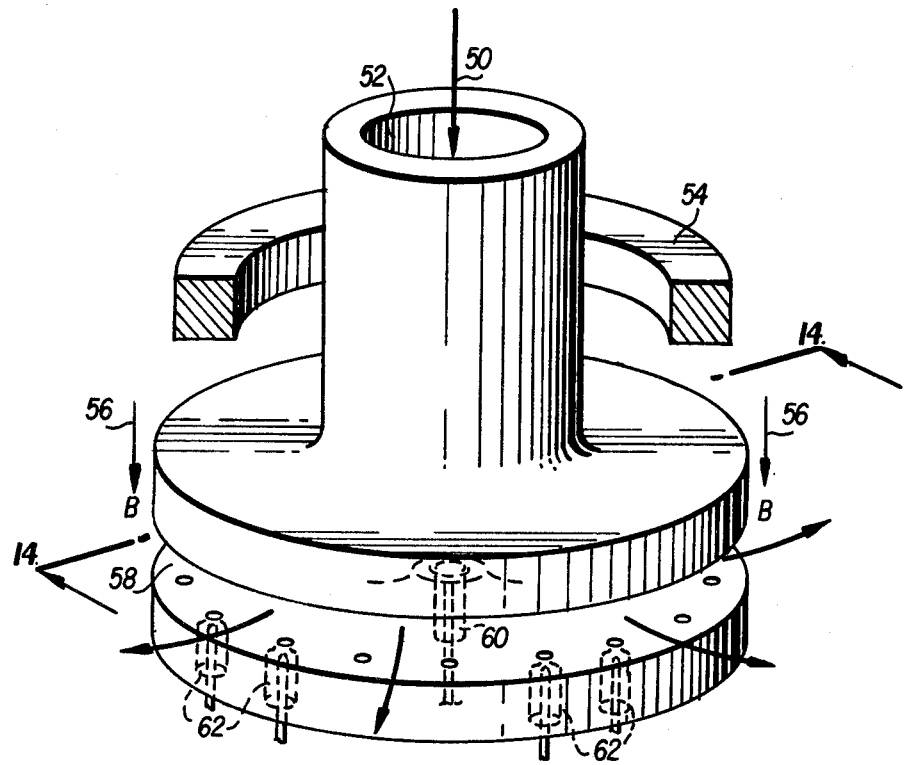
FIG. 13 is a schematic illustration of a Disc-type MHD generator having a single large gaseous electrode in the center and a plurality of smaller gaseous electrodes with embodiments similar to that of FIG. 10.
Figure 14:
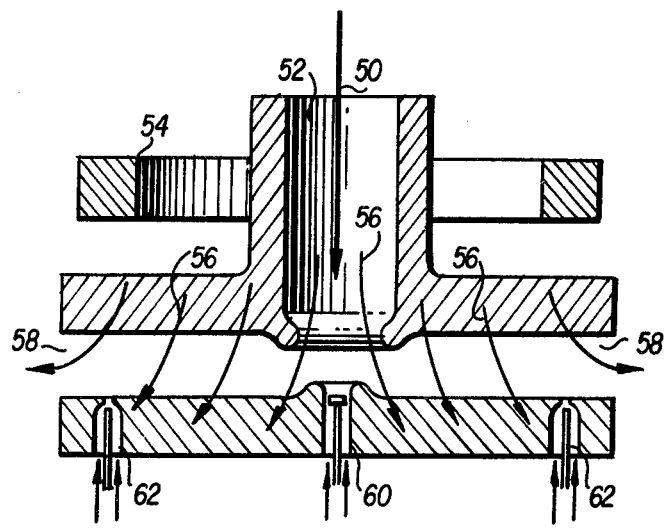
FIG. 14 is a cross-sectional view of FIG. 13 taken along the line 14—14 thereof.

It is possible, however, that in certain MHD generators, such as the "disc" generator configuration shown in FIGS. 13 and 14, that both arc source electrodes and HF gaseous electrodes could be used. In this MHD generator the high temperature electrically conducting gas 50 flows into an inlet tube 52 and then radially outward about a 360° disc-shaped MHD channel 58. This radial flow is 90° with respect to the magnetic field 56 produced by the coil 54. This flow of conducting gas past the magnetic field induces a circumferential current in the gas (the so-called "Faraday" current which is due to the same effect that produces the current 19 in the FIG. 1 embodiment). This circular current circulating around the disc channel itself then reacts further with the magnetic field due to its motion at 90° with the field to produce an EMF (termed the "Hall" EMF) along a radial line of the disc. This thus produced "Hall current" along a radial line may be collected by electrodes 60 and 62. This Hall current can then be provided to power an external load, such as shown in FIG. 1.

The electrodes 60 and 62 may be solid metal, with 60 being a contoured circular cap and with 62 being an annular ring both of which are insulated from the containing disc channel base; however in the embodiment shown in FIGS. 13 and 14, the electrodes are gaseous electrodes. In the configuration shown in FIGS. 13 and 14, the center electrode 60 must carry the total load current carried by the sum of all the other electrodes 62. Therefore an arc-source gaseous electrode such as the electrode more fully described in U.S. Pat. No. 3,940,641 issued Feb. 24, 1976 and assigned to the same assignee as this application is preferred due to its known operational characteristics. However, the outer electrodes could be any of the forms of the HF gaseous electrodes described in this application. It is believed that a single HF plasma torch-type electrode using the same embodiment as shown in FIGS. 10 and 11, only with a single output nozzle, would be ideally suited for this disc generator. Depending upon the actual operating voltages and currents for any MHD generator, either all arc-source, all HF, or some combination of gaseous electrodes may be suitable.

For the disc generator shown in FIGS. 13 and 14, the HF gaseous electrode has the before mentioned advantage over the arc-source generator in that the curvature of the magnetic field 56 (FIG. 14) has little adverse effect on its operation.

Another aspect of disc generators, not shown in FIGS. 13 and 14, which are schematic in nature, is that a "swirl" or vortex component may be added to the inlet flow 50. This would not adversely affect the operation of the previously mentioned gaseous electrodes but would improve the power output of the generator.

While the invention has been particularly shown and described with reference to preferred embodiments thereof, it will be understood by those skilled in the art that various alternatives in form and detail may be made therein without departing from the spirit and scope of the invention.

What is claimed is:

1. An MHD system having a duct through which a plasma stream may be passed, means for producing a magnetic field across said duct, and an electrode assembly comprising:
    an electrode positioned in the side wall of said duct adjacent to said plasma stream;
    means for providing an ionizable gas;
    said electrode having a cavity therein connected to receive the ionizable gas from said providing means;
    antenna means in said cavity for radiating high frequency power therein to ionize said gas; and
    said electrode having an emission opening for receiving said gas after ionization by said antenna means and for emitting it into said duct.

2. The MHD system of claim 1, further comprising tuning means positioned in said cavity.

3. The improvement in the MHD system of claim 1, wherein said means for providing said gas to said cavity for the ionization thereof is a plenum chamber.

4. The improvement of claim 1, wherein said gas is inert.

5. The improvement of claim 1, wherein said gas is argon.

6. The improvement in the MHD system of claim 1, further comprising a diagnostic antenna means positioned adjacent said cavity for recording the internal conditions therein.

7. The improvement in the MHD system of claim 1, further comprising said tuning member being positioned at a right angle with respect to said antenna.

8. The improvement in the MHD system of claim 1, further comprising said cavity having multiple openings communicating therefrom with said duct means.

9. The improvement in the MHD system of claim 8, wherein said gas is ionized by a wave guide connected to said cavity.

10. The improvement of claim 9, wherein said gas is inert.

11. The improvement of claim 9, wherein said gas is argon.

12. The improvement in the MHD system of claim 8, further comprising a gas shield positioned adjacent a plenum chamber communicating with said cavity and opaque to the passage of said gas but transparent to the passage of the high frequency power.

13. The improvement in the MHD system of claim 12, further comprising a telescopic antenna wherein the inert and the outer conductive members are movable relative to one another thereby providing for the matching of the impedance of the high frequency power input and the cavity.

14. A method of operating a gaseous electrode for a MHD system of the type in which an ionizable gas is ionized in a cavity therein, said method comprising the steps of:
    using a high frequency power source to radiate high frequency energy into said cavity for the ionization of the gas therein; and
    emitting said thus ionized gas into the main plasma stream of said MHD generator.

15. An improvement in the method of operating a gaseous electrode of the type set forth in claim 14 wherein said ionized gas is injected from said cavity through an opening in said electrode into a duct means by continuously supplying ionizable gas to the cavity.

16. The method of claim 14 wherein said electrode is tuned by impedance matching in the cavity to insure the maximum utilization of the radiated energy for the ionization of the gas.

17. The method of claim 16 wherein said MHD generator includes a second electrode spaced along said duct and said improved method includes the steps of:
    connecting a load between the first electrode and said second electrode, and
    thereby supplying power to said load.

* * * * *